United States Patent [19]

Isaka

[11] Patent Number: 4,686,661
[45] Date of Patent: Aug. 11, 1987

[54] INFORMATION PROCESSING APPARATUS USED IN A MAGNETO-OPTICAL INFORMATION RECORDING-REPRODUCING APPARATUS AND HAVING IMPROVED ERASING CAPABILITY

[75] Inventor: Kazuo Isaka, Yokohama, Japan

[73] Assignee: Canon Kabushiki Kaisha, Tokyo, Japan

[21] Appl. No.: 620,808

[22] Filed: Jun. 14, 1984

[30] Foreign Application Priority Data

Jun. 23, 1983 [JP] Japan .................. 58-111810

[51] Int. Cl.$^4$ .............. G11B 5/024; G11B 5/127; G11B 11/10
[52] U.S. Cl. ..................... 369/13; 360/114; 360/118; 360/59; 360/66
[58] Field of Search ............. 369/13, 14, 111; 360/59, 60, 66, 114, 118; 365/10, 122, 218

[56] References Cited

U.S. PATENT DOCUMENTS

| | | | |
|---|---|---|---|
| 3,740,734 | 6/1973 | Maldonado | 365/218 |
| 4,442,463 | 4/1984 | Krishnamurty et al. | 360/66 |
| 4,472,748 | 9/1984 | Kato et al. | 360/59 |
| 4,495,530 | 11/1985 | Yanagida | 360/59 |
| 4,566,088 | 1/1986 | Yoshida et al. | 369/111 |
| 4,581,661 | 4/1986 | Uehara et al. | 360/118 |
| 4,613,919 | 9/1986 | Miyatake et al. | 360/118 |

FOREIGN PATENT DOCUMENTS 0014304  1/1983  Japan .................. 369/13

*Primary Examiner*—Raymond F. Cardillo
*Assistant Examiner*—Hoa T. Nguyen
*Attorney, Agent, or Firm*—Fitzpatrick, Cella, Harper & Scinto

[57] ABSTRACT

An information processing apparatus for effecting the erasure of information recorded on a recording medium has wide area erasing means for erasing the recording information of a wide area recorded on the recording medium, and narrow area erasing means for erasing the recorded information of a relatively narrow area as compared with the wide area erasing means. The wide area erasing means and the narrow area erasing means are used together to erase a desired range of recorded information.

5 Claims, 6 Drawing Figures ized apparatus, and particularly to an information processing apparatus suitable for a magneto-optical information recording-reproducing apparatus in which a disk having a magnetic film is rotated and information signals are recorded concentric circles or in a spiral on the magnetic film by the utilization of a light beam or the signals recorded on the magnetic film are reproduced or erased.

INFORMATION PROCESSING APPARATUS USED IN A MAGNETO-OPTICAL INFORMATION RECORDING-REPRODUCING APPARATUS AND HAVING IMPROVED ERASING CAPABILITY

BACKGROUND OF THE INVENTION

1. Field of the Invention

This invention relates to an information processing apparatus, and particularly to an information processing apparatus suitable for a magneto-optical information recording-reproducing apparatus in which a disk having a magnetic film is rotated and information signals are recorded concentric circles or in a spiral on the magnetic film by the utilization of a light beam or the signals recorded on the magnetic film are reproduced or erased.

2. Description of the Prior Art

In prior-art information processing apparatus, for example, in prior art magneto-optical information recording-reproducing apparatus, a disk which is called an magneto-optical disk comprising a thin film of ferromagnetic material formed on a nonmagnetic member such as a glass plate is generally used as the recording medium.

During the recording of information signals, the magnetic film on this recording medium is magnetized in advance in a predetermined direction perpendicular to the surface of the film and an extraneous magnetic field in the direction opposite to said predetermined direction is caused to act. Then a light beam modulated in accordance with the information is applied to the magnetic film from a recording unit comprising a laser light source, an objective lens, etc. The portion to which the light beam has been applied is increased in temperature by the light energy and, when it reaches the curie point temperature (about 160° C.), the direction of magnetization becomes disordered. When the position of the light beam is then moved to another portion of the recording medium with the movement, the portion to which the light beam has so far been applied is decreased in temperature and is again magnetized in the opposite direction of magnetization by extraneous magnetic field. In this manner, the information is recorded as the reversal of magnetization on the magnetic film and a signal row is formed.

On the other hand, during the reading of information signals, a light beam oscillated from a laser light source such as a semiconductor laser, provided in the reproducing unit and polarized by a polarizer, is applied to the signal row formed on the magnetic film and, by the magnetic Kerr effect, the light beam is reflected as a light whose plane of polarization has been rotated in accordance with the direction of magnetization of the portion to which the light beam has been applied. This reflected light is separated from the incident light by a beam splitter or the like of the reproducing unit, and is directed to a light-receiving element through an analyser, and the direction of magnetization of the signal row is detected from the direction of polarization of the reflected light by a detection signal obtained from the light-receiving element, whereby the information is reproduced.

FIG. 1 of the accompanying drawings shows an example of the construction of the optical system of a magneto-optical information recording-reproducing apparatus according to the prior art. In FIG. 1, reference numeral 1 designates a semiconductor laser, reference numeral 2 denotes a collimater lens, reference numeral 3 designates a polarizer, reference numeral 4 denotes a polarized beam splitter, reference numeral 5 designates a reflecting mirror, reference numeral 6 denotes a tracking mirror, reference numeral 7 designates an objective lens, reference numeral 9 denotes a quarter wave plate, reference numeral 10 designates a condensing lens, reference numeral 11 denotes a cylindrical lens, reference numeral 12 designates an analyser, and reference numeral 13 denotes a light-receiving element. These components 1–13 together constitute a recording and reproducing unit and are placed on a head member, not shown, and may be moved as a unit radially of a recording medium 14 by drive means, not shown. The mirror 5 and the tracking mirror 6 are pivotably mounted and can vibrate at a high frequency in the direction of the arrow. Further, the objective lens 7 is of the generally used voice coil type and is drivingly controlled in the direction of focus.

In the apparatus of FIG. 1, during the recording, a light beam modulated in accordance with the information to be recorded is emitted from the semiconductor laser 1. The light beam is collimated by the collimater lens and has its direction of polarization determined by the polarizer 3, whereafter it is condensed on the recording medium 14 by the objective lens 7 via the polarizing beam splitter 4, the reflecting mirror 5 and the tracking mirror 6, and the information is recorded in the process as previously described. Although not shown, a bias magnetic field producing device for producing an extraneous magnetic field is disposed near the portion of the recording medium to which the light beam is applied. Also, at the same time, part of said light beam is reflected and returns along a part of the optical path, and is directed from the polarizing beam splitter 4 to the light-receiving element 13. At that time, this reflected light passes through an astigmatic system comprising the condensing lens 10 and the cylindrical lens 11 and is received by the four-division light-receiving element 13. Therefore, any focus deviation is detected by the light-receiving element 13 and the objective lens 10 is driven in conformity with the detection signal, whereby the distance between the objective lens 10 and the recording medium 14 is kept constant. At this time, the mirror 5 and the tracking mirror 6 may be electrically fixed and held. In this manner, the above-described optical system 1–13 constituting the recording-reproducing unit is placed on a head member (a carrier) movable radially of the recording medium 14 and is moved radially in response to the rotation of the recording medium 14, thereby recording the information circularly or spirally on the recording medium 1.

During the reproduction of the information, an unmodulated light beam emitted from the semiconductor laser 1 is applied to the recording medium 14 and any variation in the direction of polarization of the reflected light therefrom is discriminated by the analyser 12 to thereby reproduce the information. In that case, the output of the semiconductor laser 1 is made smaller than that during recording (for example, ½ of the output during recording), thereby suppressing the temperature rise of the magnetic thin film to prevent the recorded signals from being affected.

Now, it is usually the case with the recording medium 14 that it is eccentric, though slightly, due to the vibration or the like thereof. Therefore, reproduction of information is effected while the so-called tracking control is effected in which the amount of eccentricity of the recording medium is detected by the output signal of the light-receiving element 13 and the tracking mirror 6 is driven in accordance with the detection signal to cause the light beam to properly scan the signal row.

The magneto-optical recording apparatus of this type is capable of accomplishing very high density recording and has a recording density higher by one to two units than that of a magnetic disk. For example, a magneto-optical disk having a diameter of 300 mm is capable of containing theron about 10,000 pages of information of format A4, 16 pel/mm. An example of the then recording condition is shown in FIG. 2 of the accompanying drawings, wherein the width Dw in the major scanning direction of the recording beam spot BS is of the order of 1.3-1.8 µm and the pitch P in the radial direction (the minor scanning direction) of the bit row of a recording bit BB is about two to three times the width Dw.

A futher feature of the magneto-optical disk is that it permits not only recording and reproducing of information but also re-recording and permits unnecessary information to be erased and new information to be again written into the erased portion. In the prior-art magneto-optical recording apparatus, one of the following systems is adopted as the erasing system for erasing the bit information once recorded on the magneto-optical disk:

(i) The system whereby the track (the recorded bit row) of the magneto-optical disk is scanned by a light beam used for information recording and bit information is erased on each track having a width of 1-5 µm; and (ii) The system whereby an extraneous magnetic field greater than the coercive force of the magnetic film is applied by a permanent magnet or an electromagnet and the erasure of the bit information in a wide area is effected at one time.

However, these conventioaal systems have suffered from the following disadvantages:

(a) In the erasing system mentioned under item (i) above, the erasure of bit information is effected in units of one track and therefore, it takes much time to effect erasure of a wide range of information. For example, assuming that the track pitch is 3.3 µm and the magneto-optical disc is rotating at 1800 r.p.m., it will take ten seconds or more to erase track information of a width of 1 mm and it will take one minute or more to erase track information to a width 1 cm. Thus, this system is not suitable for high-speed erasure of information.

(b) In the erasing system mentioned under item (ii) above, the magneto-optical disk rotates at a high speed of 200-1800 r.p.m. and generally, for the purpose of protecting the recording layer, the surface thereof is coated with a protective film. The magneto-optical disk has a magnetic layer in the interior in the direction of thickness thereof and therefore, there is a gap or space on the order of 1-5 mm from the surface of the magnetic field producing means (the extraneous magnetic field) to the magnetic layer. Therefore, in the surface of the magnetic layer opposed to the end portion of the magnetic field producing means, owing to that gap, there exists an intermediate range of the magnetic field intensity between a range having an erasable and a range having an unerasable non-magnetic field. Thus reliable erasure of bit information cannot be accomplished. Also, this system is characterized by the possibility of wrong erasure of necessary data owing to an unnecessarily wide permanent magnet or electromagnet and lacks reliability.

FIG. 3 of the accompanying drawings shows an example of a mode of recorded information erasure of the prior-art apparatus by the system of item (ii) above. As shown, by the magnetic field producing means 16 disposed above the recording magnetic layer 15 of the recording medium 14, a magnetic field greater than the coercive force of the magnetic layer 15 is applied to the recording magnetic layer 15 to thereby effect reversal of the magnetization of the magnetic layer 15 and to erase the recorded information. However, the magnetic field intensity of the surface of the magnetic layer 15 is considerably greater than said coercive force in a surface 17 opposed to the magnetic field producing means 16 (the portion indicated by bidirectional hatching and hereinafter referred to as the reliably erased area), but is substantially equal to said coercive force in surfaces 18 opposed to the vicinity of the end portions of the magnetic field producing means 16 (the portions indicated by hatching and hereinafter referred to as the unreliably erased areas).

In the unreliably erased areas 18, the coercive force of the magnetic layer 15, the intensity of the magnetic field produced by the magnetic field producing means 16 and the gap between the magnetic field producing means 16 and the magnetic layer 15 are irregular and therefore, it is impossible to clearly prescribe the boundary between the erased area and the non-erased area.

SUMMARY OF THE INVENTION

It is an object of the present invention to provide an information processing apparatus for reliably erasing in a short time information recorded in a desired erased area over a wide range.

To achieve such object, the present invention provides wide area erasing means capable of, when the erasure of recorded information of a predetermined area recorded on a recording medium is to be effected, erasing the recorded information at one over a wide area, and narrow area erasing means for more reliably erasing an area unreliably erased by the wide area erasing means, the wide area erasing means and the narrow area erasing means being used together to efficiently effect the erasure of the recorded information.

The invention will become more fully apparent from the following detailed description thereof taken in conjunction with the accompanying drawings.

DESCRIPTION OF THE PREFERRED EMBODIMENTS

Figure 4:
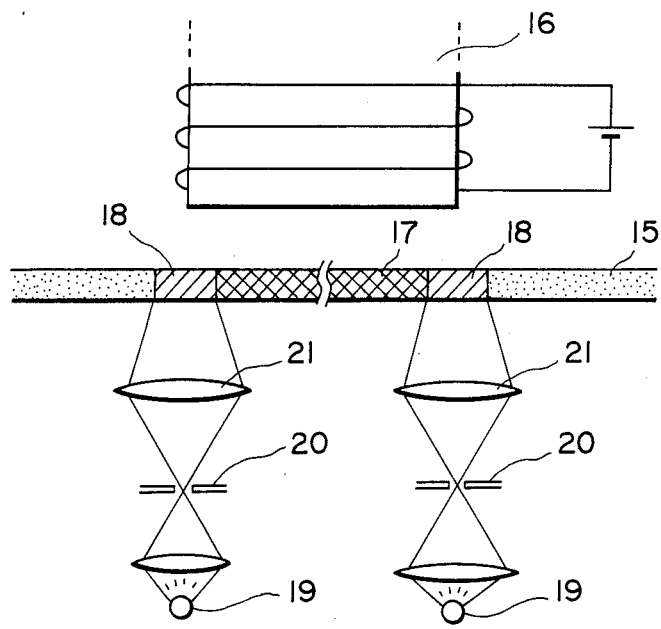
FIGS. 4, 5 and 6 are front views showing examples of the construction of the essential portions of the information processing apparatus of the present invention.

FIG. 4 shows an example of the construction of the essential portions of the information processing apparatus of the present invention. The construction of the other portions is substantially similar to that of the prior-art apparatus of FIG. 1 and therefore is not shown in FIG. 4. In FIG. 4, reference numeral 19 designates a pair of light sources (for example, infrared light sources) disposed in opposed relationship with the recording magnetic layer 15 of the recording medium 14 (see FIG. 1) and movable relative to the recording magnetic layer 15 with magnetic field producing means 16. The magnetic field producing means is comprised of a kind of electromagnet including, for example, an iron core and a coil wound around it. During the erasure of recorded information, the light generated from each of the light sources 19 is stopped down into a light beam of uniform intensity distribution having a diameter of approximately 0.1-2 mm by an objective lens 21 and a slit 20 and is applied to the unreliably erased area 18 of the magnetic layer 15.

In this manner, during the erasure of recorded information, the magnetic layer 15 can be heated to the curie point temperature by a light ray such as an infrared ray simultaneously with the application of the magnetic field by the magnetic field producing means 16 and therefore, it then becomes possible reliably to erase the recorded information in the unreliably erased area 18 completely. That is, at this time, the magnetic field producing means 16 performs the function of wide area erasing means which erases the recorded information in a predetermined area on the recording medium 14 over a wide area at one time, and the optical system 19-21 performs the function of narrow area erasing means which erases the unreliably erased areas 18 more reliably than does the wide area erasing means 16.

In this case, when the sensitivity of the magnetic layer 15 is 1 nJ/$\mu m^2$ (1 Mbit/sec.), an adequate intensity of outputs of the erasing light sources 19 is of the order of $10^3$ W/mm$^2$. Also, in the present embodiment, more or less unreliably erased areas may be created by the eccentricity resulting from the mounting or dismounting of the re-recording medium 14, but in such case, recording may preferably be effected on the erased area with the end portion of this erased area, having a width on the order of 0.5 mm, remaining erased as it is.

Figure 5:
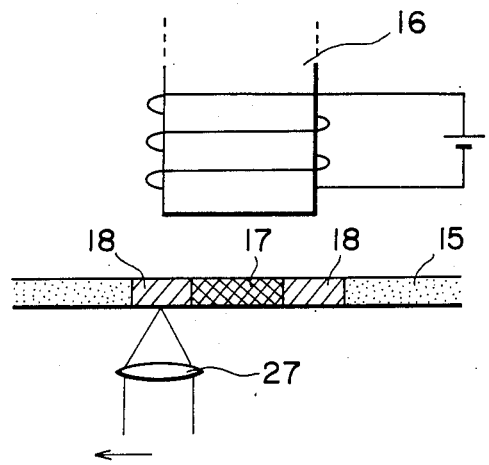

FIG. 5 shows the construction of portions of another embodiment of the apparatus of the present invention. In the present embodiment, light beam applying means for information recording is used also as narrow area erasing means. The construction of this light beam applying means is similar to that shown in the prior-art apparatus of FIG. 1. In FIG. 5, the unreliably erased areas 18 at the boundary portion of the reliably erased area 17 in which the directions of magnetization are determined by the magnetic field provided by magnetic field producing means 16, are heated by a light beam condensed through an objective lens 27, and thus the coercive forces in those unreliably erased areas are reduced and the information recorded thereon is reliably erased with an acid of the magnetic field by the magnetic field producing means 16 as an auxiliary magnetic field.

Comparison will be made between the embodiment of FIG. 5 and one example for the purpose of clarifying the technical advantage of this embodiment.

Figure 1:
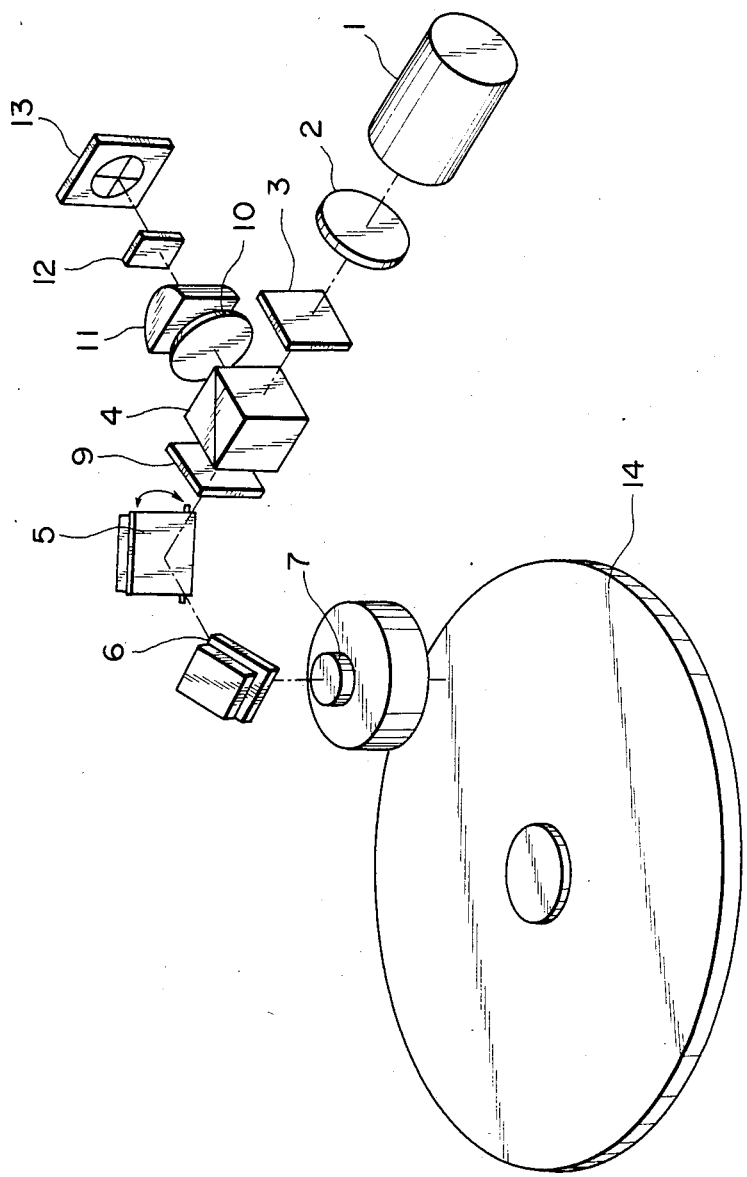
FIG. 1 is a perspective view showing an example of the construction of a magneto-optical information recording-reproducing apparatus according to the prior art.
Figure 2:
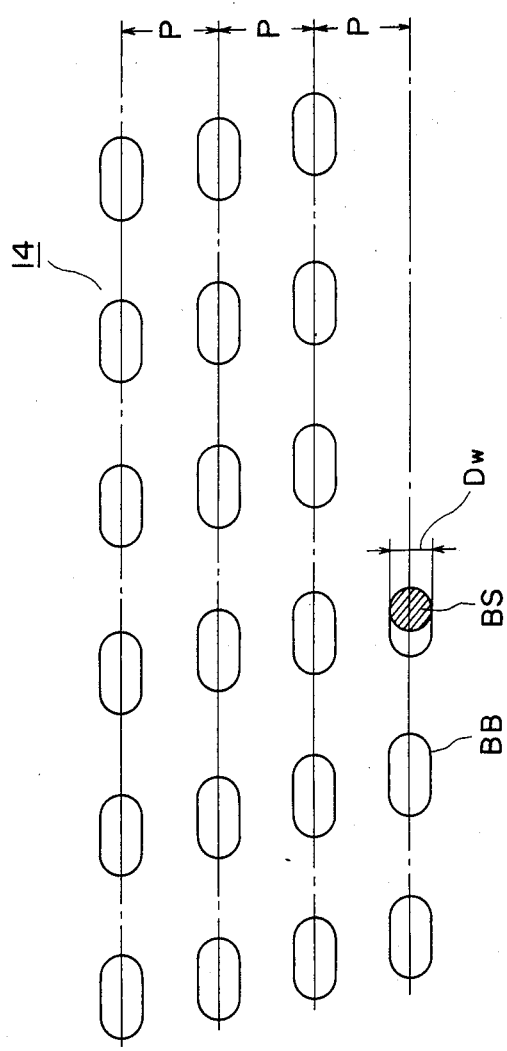
FIG. 2 is a schematic plan view showing the manner in which information is recorded on a recording medium.
Figure 3:
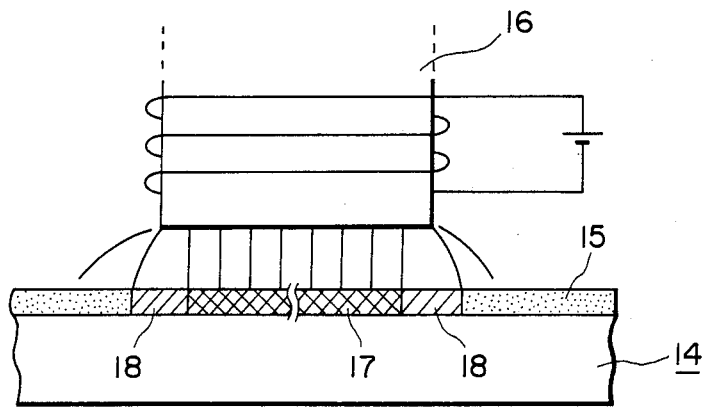
FIG. 3 is a front view showing an example of recorded information erasing means in the prior-art apparatus.

For example, when, erasure of information is to be effected over the width of 30 mm in the diametral direction of the recording medium 14, if the width of the magnetic field producing means 16 is 30 mm and the gap between the magnetic field producing means 16 and the magnetic layer 15 is 3 mm, the unreliably erased areas 18 will be created over a width of 1-3 mm at the opposite sides of the reliably erased area 17. Assuming that the width of the unreliably erased areas 18 is 2 mm, it takes about five minutes to erase the information over the width of 30 mm by the light beam condensed by the objective lens as shown in FIG. 1 with the aid of an extraneous magnetic field not greater than the coercive force when the number of revolutions of the recording medium 14 is 1800 r.p.m. and the track pitch is 3.3 $\mu m$, whereas in the present embodiment, the time required for the erasure can be shortened to forty seconds because use is made of both an application larger than the coercive force of the magnetic field of the magnetic field producing means 16 with respect to the central portion of the width of 30 mm and the application of the light beam with respect to the portion on either side of the width of 30 mm. Further, in the present embodiment, the light beam is scanned independently of the magnetic field applying means and the erasure of the unreliably erased areas 18 can be effected while tracking is effected along the tracks of the recording medium and therefore, reliable erasure becomes possible without the influence of eccentricity of the recording medium during the rotation of the medium.

Figure 6:
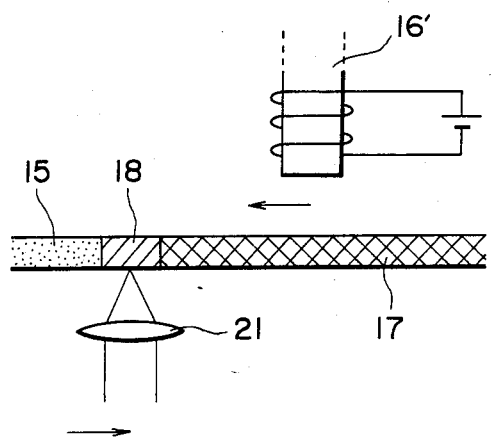

FIG. 6 shows still another example of the construction of the present invention. In the present example, magnetic field producing means 16' is made compact and this means is scanned relative to the recording medium, thereby accomplishing wide area erasure. Narrow area erasure is effected by moving the magnetic field producing means 16' to the vicinity of the boundary of a desired erased area (the unreliably erased area 18) to apply to the area 18 an extraneous magnetic field not greater than the coercive force and then applying a light beam to the recording medium through an objective lens 21. This light beam also is scanned relative to the recording medium. The light beam may be a light beam for information recording as in the embodiment shown in FIG. 5, or may be provided entirely discretely from the recording or reproducing unit.

The above-described embodiments of the present invention have been shown with respect to a case where the magnetic field producing means 16 or 16' is used as the wide area erasing means, whereas instead of using such means 16 or 16', it is of course possible to heat a predetermined area of the recording medium to the curie point temperature by thermal extraneous heating means such as a heater and thereby erase information.

While description has been made of the information erasure on the magneto-optical disk medium, the present invention is also applicable to an optical disk medium which permits the erasure and recording-reproducing using other heat mode.

What is claimed is:

1. An information processing apparatus for erasing information recorded on a magneto-optical recording medium in a magneto-optical information recording-reproducing system, said magneto-optical recording medium having a magnetic film with an intrinsic coercivity on which information is recorded by a variation in direction of magnetization, said apparatus comprising:

magnetic field producing means for applying an extraneous magnetic field to a partial area of the magneto-optical recording medium, said extraneous magnetic field being greater than said intrinsic coercivity of said magnetic film; and means for applying a light beam to a boundary portion of said partial area of the recording medium to heat said magnetic film to about its curie point in said boundary portion to ensure complete erasure thereof.

2. An information processing apparatus according to claim 1, wherein said magnetic field producing means comprises an electromagnet provided in opposed relationship with said recording medium.

3. An information processing apparatus according to claim 1, wherein said magnetic field producing means and said light beam applying means are movable together relative to said recording medium.

4. An information processing apparatus according to claim 1, wherein said light beam applying means is mounted to scan the light beam on said recording medium independently of application of the extraneous magnetic field thereto by said magnetic field producing means.

5. An information processing apparatus according to claim 1, wherein said light beam applying means is used also when information is recorded on said recording medium.

* * * * *